US012720501B2

(12) United States Patent
Dutta et al.

(10) Patent No.: US 12,720,501 B2
(45) Date of Patent: Aug. 25, 2026

(54) SIDELINK RESOURCE SELECTION BASED ON AN EXCLUSION OF SIDELINK FEEDBACK CHANNEL SLOTS

(71) Applicant: QUALCOMM Incorporated, San Diego, CA (US)

(72) Inventors: Sourjya Dutta, San Diego, CA (US); Gabi Sarkis, San Diego, CA (US); Tien Viet Nguyen, Bridgewater, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/522,838

(22) Filed: Nov. 29, 2023

(65) Prior Publication Data

US 2024/0292377 A1 Aug. 29, 2024

Related U.S. Application Data

(60) Provisional application No. 63/487,239, filed on Feb. 27, 2023.

(51) Int. Cl.

| | |
|---|---|
| ***H04W 72/02*** | (2009.01) |
| ***H04B 17/318*** | (2015.01) |
| ***H04W 72/40*** | (2023.01) |
| ***H04W 72/566*** | (2023.01) |

(52) U.S. Cl.

CPC .......... *H04W 72/02* (2013.01); *H04B 17/328* (2023.05); *H04W 72/40* (2023.01); *H04W 72/569* (2023.01)

(58) Field of Classification Search

None

See application file for complete search history.

(56) References Cited

U.S. PATENT DOCUMENTS

| | | | | |
|---|---|---|---|---|
| 2025/0097719 | A1* | 3/2025 | Yoshioka | H04W 52/242 |
| 2025/0097959 | A1* | 3/2025 | Kang | H04W 72/02 |
| 2025/0317942 | A1* | 10/2025 | Lyu | H04W 72/044 |

* cited by examiner

*Primary Examiner* — Saad Khawar

(74) *Attorney, Agent, or Firm* — Harrity & Harrity, LLP

(57) ABSTRACT

Various aspects of the present disclosure generally relate to wireless communication. In some aspects, a first user equipment (UE) may receive, by a first radio access technology (RAT) sidelink module from a second RAT sidelink module, second RAT sidelink reservation information, the second RAT sidelink reservation information indicating a reference signal received power (RSRP) value. The first UE may perform, using the first RAT sidelink module, a first RAT sidelink resource selection based at least in part on the RSRP value indicated in the second RAT sidelink reservation information, wherein the first RAT sidelink resource selection is based at least in part on an exclusion or an inclusion of one or more single slot resources in a non-first-RAT-PSFCH slot or in a first RAT physical sidelink feedback channel (PSFCH) slot. Numerous other aspects are described.

30 Claims, 7 Drawing Sheets

SIDELINK RESOURCE SELECTION BASED ON AN EXCLUSION OF SIDELINK FEEDBACK CHANNEL SLOTS

CROSS-REFERENCE TO RELATED APPLICATION

This Patent Application claims priority to U.S. Provisional Patent Application No. 63/487,239, filed on Feb. 27, 2023, entitled "SIDELINK RESOURCE SELECTION BASED ON AN EXCLUSION OF SIDELINK FEEDBACK CHANNEL SLOTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink resource selection based at least in part on an exclusion of physical sidelink feedback channel (PSFCH) slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, that, based at least in part on information stored in the memory, are configured to: receive, by a first radio access technology (RAT) sidelink module of the first UE from a second RAT sidelink module of the first UE, second RAT sidelink reservation information associated with a second RAT reservation, the second RAT sidelink reservation information indicating a reference signal received power (RSRP) value associated with received reservation information from another UE operating on the second RAT; perform, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT physical sidelink feedback channel (PSFCH) slot using the second RSRP threshold; and transmit, by the first RAT sidelink module and to a second UE, a first RAT sidelink transmission based at least in part on the first RAT sidelink resource selection.

In some implementations, a method of wireless communication performed by a first UE includes receiving, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT; performing, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold; and transmitting, by the first RAT sidelink module and to a second UE, a first RAT sidelink transmission based at least in part on the first RAT sidelink resource selection.

In some implementations, a non-transitory computer-readable medium storing a set of instructions for wireless communication includes one or more instructions that, when executed by one or more processors of a first UE, cause the first UE to: receive, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT; perform, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold; and transmit, by the first RAT sidelink module and to a second UE, a first RAT sidelink transmission based at least in part on the first RAT sidelink resource selection.

In some implementations, a first apparatus for wireless communication includes means for receiving, by a first RAT sidelink module of the first apparatus from a second RAT sidelink module of the first apparatus, second RAT sidelink reservation information associated with a second RAT reservation, the second RAT sidelink reservation information indicating an RSRP value associated with received reservation information from a second-RAT-only apparatus; means for performing, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold; and means for transmitting, by the first RAT sidelink module and to a second apparatus, a first RAT sidelink transmission based at least in part on the first RAT sidelink resource selection.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
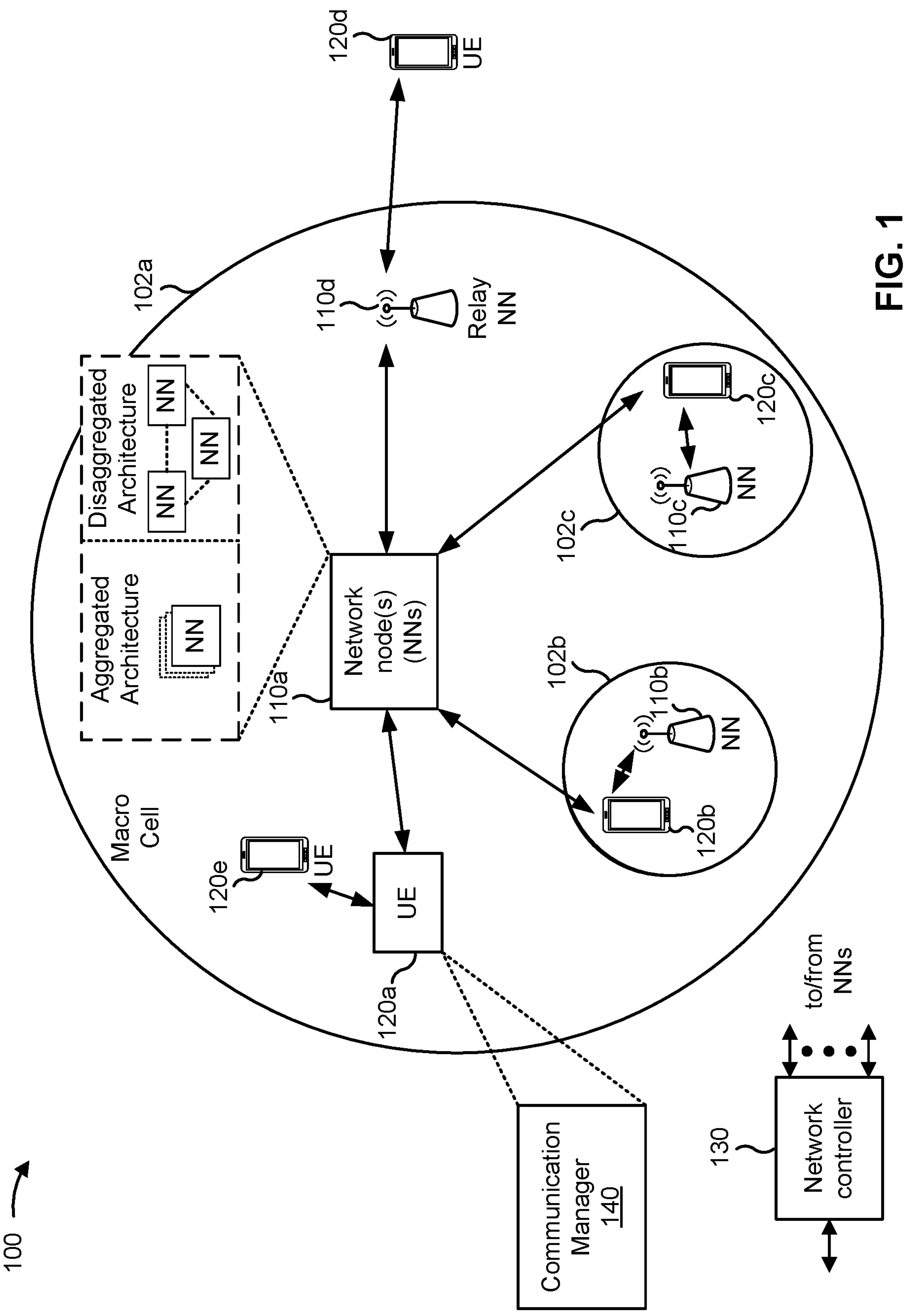
FIG. 1 is a diagram illustrating an example of a wireless network, in accordance with the present disclosure.

In a New Radio (NR) sidelink and Long Term Evolution (LTE) sidelink channel coexistence, a user equipment (UE), such as a dual mode NR sidelink and LTE sidelink UE, may coexist in a shared resource pool with a legacy LTE-only UE. The UE may be an out-of-coverage UE. The UE may include an LTE sidelink module and an NR sidelink module. The LTE sidelink module may be collocated with the NR sidelink module. The UE, via the NR sidelink module, may transmit an NR hybrid automatic repeat request (HARQ)

feedback via an NR physical sidelink feedback channel (PSFCH) slot. The UE, via the LTE sidelink module, may transmit an LTE sidelink transmission. The LTE sidelink transmission may collide with the NR HARQ feedback. When the collision occurs, the LTE sidelink transmission may be associated with an incorrect automatic gain control (AGC) setting, which may lead to a decoding failure. The AGC setting may be acceptable at a beginning of the LTE sidelink transmission, but when the collision occurs between the LTE sidelink transmission and the NR HARQ feedback, the AGC setting may no longer be acceptable due to the collision.

In some aspects described herein, a first UE may receive, by a first radio access technology (RAT) sidelink module of the first UE from a second RAT sidelink module of the first UE, second RAT sidelink reservation information associated with a second RAT reservation. A first RAT may be an NR RAT. A second RAT may be an LTE RAT. The second RAT sidelink reservation information may indicate an RSRP value associated with received reservation information from another UE operating on the second RAT. The first UE may perform, using the first RAT sidelink module, a first RAT sidelink resource selection based at least in part on the RSRP value indicated in the second RAT sidelink reservation information in relation to a first RSRP threshold or a second RSRP threshold associated with the second RAT reservation. The first RAT sidelink resource selection may be based at least in part on an exclusion or an inclusion of one or more single slot resources in a non-first-RAT-PSFCH slot using the first RSRP threshold or in a first RAT PSFCH slot using the second RSRP threshold. The non-first-RAT-PSFCH slot may be a non-NR-PSFCH slot. The first RAT PSFCH slot may be an NR PSFCH slot. The first UE may transmit, by the first RAT sidelink module and to a second UE, a first RAT sidelink transmission based at least in part on the first RAT sidelink resource selection. As a result, as part of a sidelink resource exclusion for a first RAT sidelink and a second RAT sidelink co-channel coexistence (e.g., an NR sidelink and LTE sidelink co-channel coexistence), the first RAT sidelink resource selection may be improved to eliminate or minimize second RAT sidelink and first RAT PSFCH collisions (e.g., LTE sidelink and NR PSFCH collisions), thereby improving a UE performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120*a*) may include a communication manager 140. As described in more detail elsewhere herein, the communication manager 140 may receive, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT; perform, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold; and transmit, by the first RAT sidelink module and to a second UE, a first RAT sidelink transmission based at least in part on the first RAT sidelink resource selection. Additionally, or alternatively, the communication manager 140 may perform one or more other operations described herein.

As indicated above, FIG. 1 is provided as an example. Other examples may differ from what is described with regard to FIG. 1.

Figure 2:
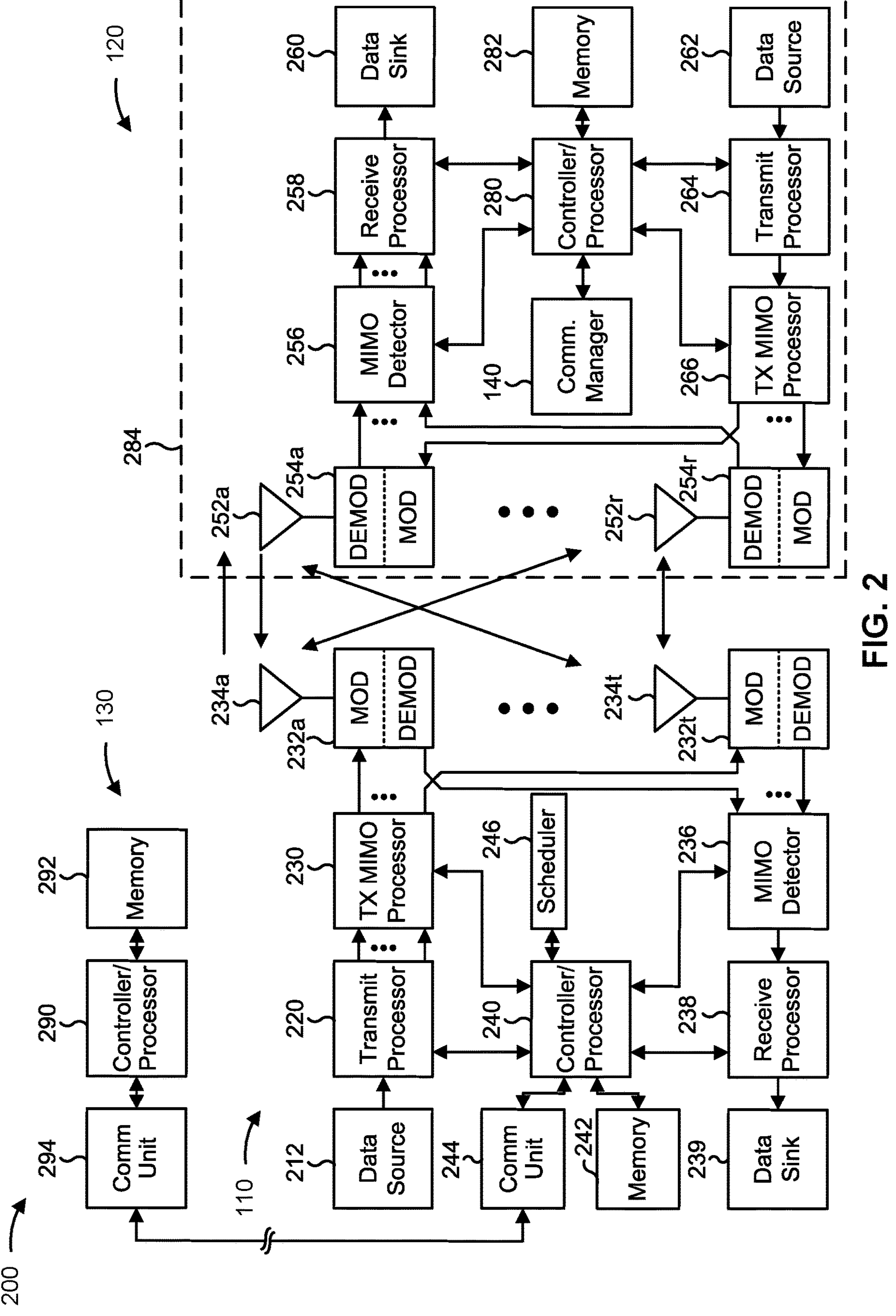
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the network node 110, the controller/processor 280 of the UE 120, and/or any other component(s) of FIG. 2 may perform one or more techniques associated with sidelink resource selection based at least in part on an exclusion of PSFCH slots, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for receiving, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT; means for performing, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold; and/or means for transmitting, by the first RAT sidelink module and to a second UE, a first RAT sidelink transmission based at least in part on the first RAT sidelink resource selection. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
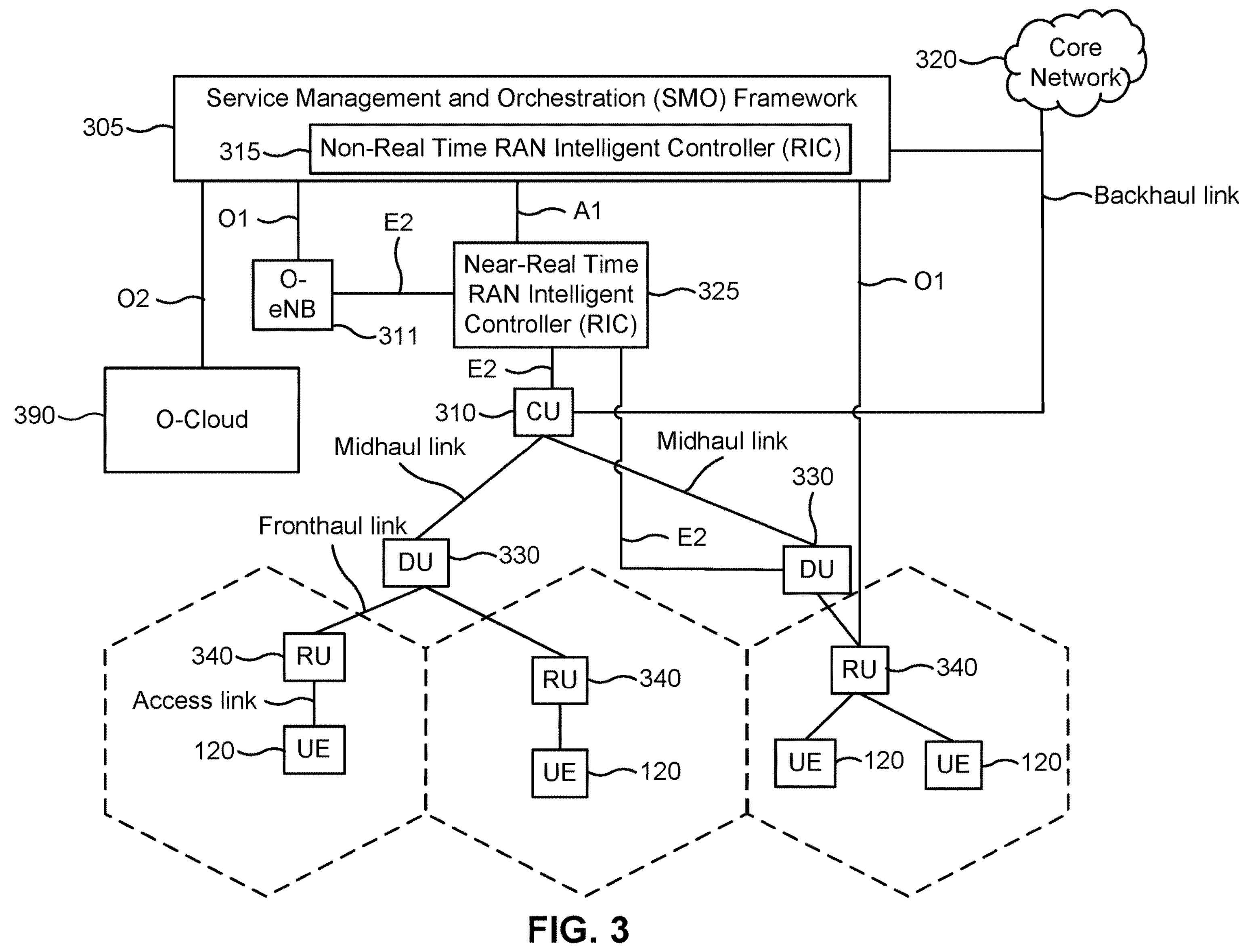
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

In an NR sidelink and LTE sidelink channel coexistence, a UE, such as a dual mode NR sidelink and LTE sidelink UE (e.g., a Type A UE), may coexist in a shared resource pool with a legacy LTE-only UE (e.g., a Type C UE). The UE may be out-of-coverage, and thus may operate without a network node (e.g., Mode 2 NR and Mode 4 LTE). The UE may include an LTE sidelink module and an NR sidelink module. In other words, the LTE sidelink module may be collocated with the NR sidelink module. The LTE sidelink module may share LTE resource reservation information with the NR sidelink module. The LTE resource reservation information may include an indication of time-frequency resources for transmissions and receptions associated with the LTE sidelink module. The LTE resource reservation information may include an indication of an RSRP associated with received reservation information from other LTE UEs. The LTE resource information may include an indication of a priority associated with the traffic/reservation.

The UE, via the NR sidelink module, may transmit an NR HARQ feedback via an NR PSFCH slot. The NR PSFCH may be associated with a special slot structure. The NR PSFCH may be associated with a relatively high signal strength. The NR PSFCH may be associated with two symbols of a slot. The UE, via the LTE sidelink module, may transmit an LTE sidelink transmission. The LTE sidelink transmission may collide with the NR HARQ feedback. When the collision occurs, the LTE sidelink transmission may be associated with an incorrect AGC setting, which may lead to a decoding failure. The AGC setting may be acceptable at a beginning of the LTE sidelink transmission, but when the collision occurs between the LTE sidelink transmission and the NR HARQ feedback, the AGC setting may no longer be acceptable due to the collision.

An AGC setting at an LTE sidelink receiver may be performed at a beginning of a slot when NR sidelink UEs are transmitting over control sidelink channels and shared sidelink channels. In a slot with an NR PSFCH, the last few NR symbols may be used for feedback transmissions which changes the power received by the LTE sidelink receiver over these symbols within the slot. Thus, the AGC setting may be incorrect in the middle of the slot, which may lead to the decoding failure.

Figure 4:
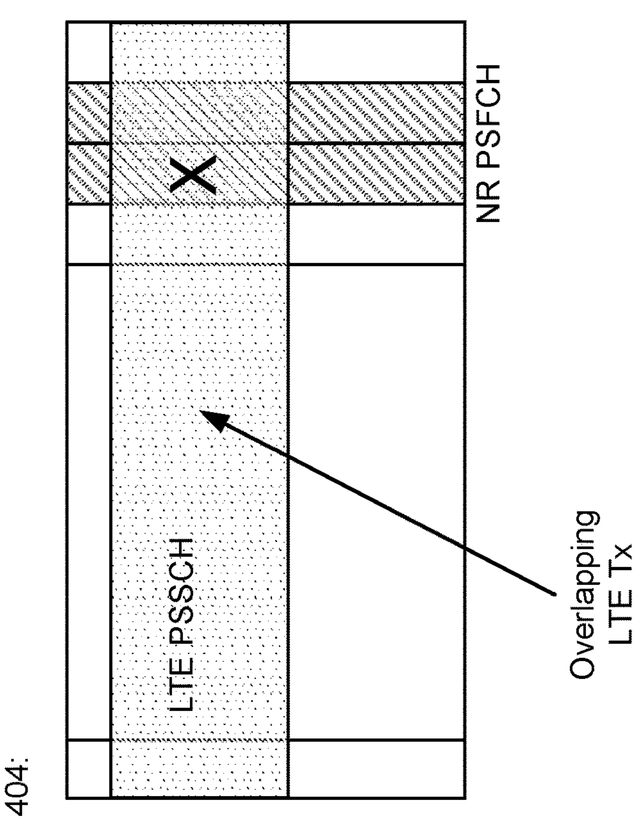
FIG. 4 is a diagram illustrating an example of overlapping transmissions, in accordance with the present disclosure.
Figure 4:
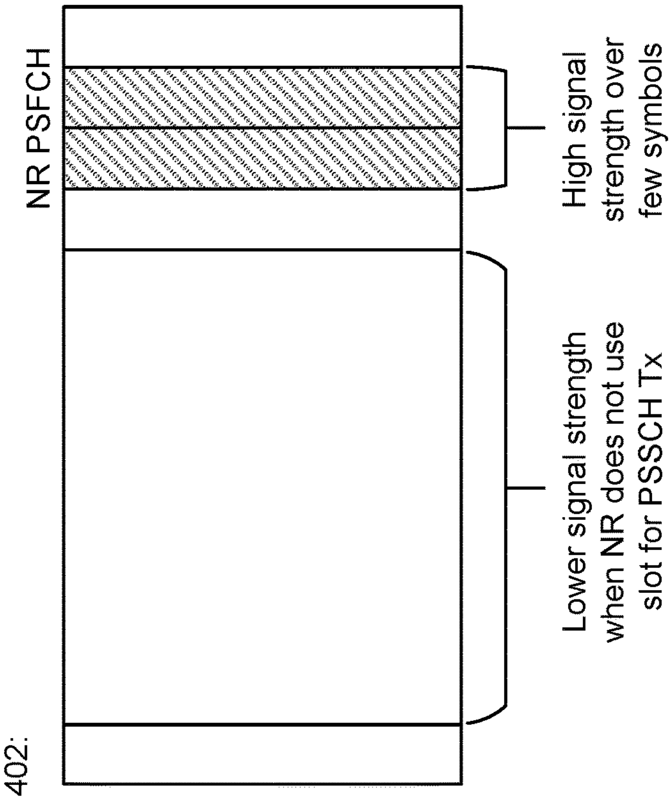

FIG. 4 is a diagram illustrating an example 400 of overlapping transmissions, in accordance with the present disclosure.

As shown by reference number 402, a slot may include a first symbol, which may be an AGC symbol. The slot may include a plurality of symbols (e.g., nine symbols), which may be associated with a lower signal strength when the plurality of symbols are not used for an NR physical sidelink shared channel (PSSCH) transmission. The slot may include one or two gap symbols. The slot may include two NR PSFCH symbols, which may be associated with a relatively high signal strength.

As shown by reference number 404, an LTE PSSCH transmission may overlap with an NR PSFCH slot. An NR PSFCH and an NR PSSCH may be used by different NR UEs. The LTE PSSCH transmission may collide with the NR PSFCH slot in which data over the PSSCH is transmitted by one UE and feedback over the PSFCH is transmitted by another UE. The LTE PSSCH transmission may collide with an NR transmission in the NR PSFCH slot. When the LTE PSSCH transmission collides with the NR PSFCH slot, the LTE sidelink transmission may have an incorrect AGC setting in the middle of the NR PSFCH slot, which may cause a decode failure.

As indicated above, FIG. 4 is provided as an example. Other examples may differ from what is described with regard to FIG. 4.

In various aspects of techniques and apparatuses described herein, a first UE may receive, by a first RAT sidelink module of the first UE from a second RAT sidelink module of the first UE, second RAT sidelink reservation information associated with a second RAT reservation. A first RAT may be an NR RAT. A second RAT may be an LTE RAT. The second RAT sidelink reservation information may indicate an RSRP value associated with received reservation information from another UE operating on the second RAT. The first UE may perform, using the first RAT sidelink module, a first RAT sidelink resource selection based at least in part on the RSRP value indicated in the second RAT sidelink reservation information in relation to a first RSRP threshold or a second RSRP threshold associated with the second RAT reservation. The first RAT sidelink resource selection may be based at least in part on an exclusion or an inclusion of one or more single slot resources in a non-first-RAT-PSFCH slot using the first RSRP threshold or in a first RAT PSFCH slot using the second RSRP threshold. The non-first-RAT-PSFCH slot may be a non-NR-PSFCH slot (e.g., a slot that does not contain an NR PSFCH). The first RAT PSFCH slot may be an NR PSFCH slot. The single slot resources in the non-first-RAT-PSFCH slot or in the first RAT PSFCH slot that are selected or excluded may be PSSCH resources. The first UE may transmit, by the first RAT sidelink module and to a second UE, a first RAT sidelink transmission based at least in part on the first RAT sidelink resource selection. As a result, as part of a sidelink resource exclusion for a first RAT sidelink and a second RAT sidelink co-channel coexistence (e.g., an NR sidelink and LTE sidelink co-channel coexistence), the first RAT sidelink resource selection may be improved to eliminate or minimize second RAT sidelink and first RAT PSFCH collisions (e.g., LTE sidelink and NR PSFCH collisions), thereby improving a UE performance.

Figure 5:
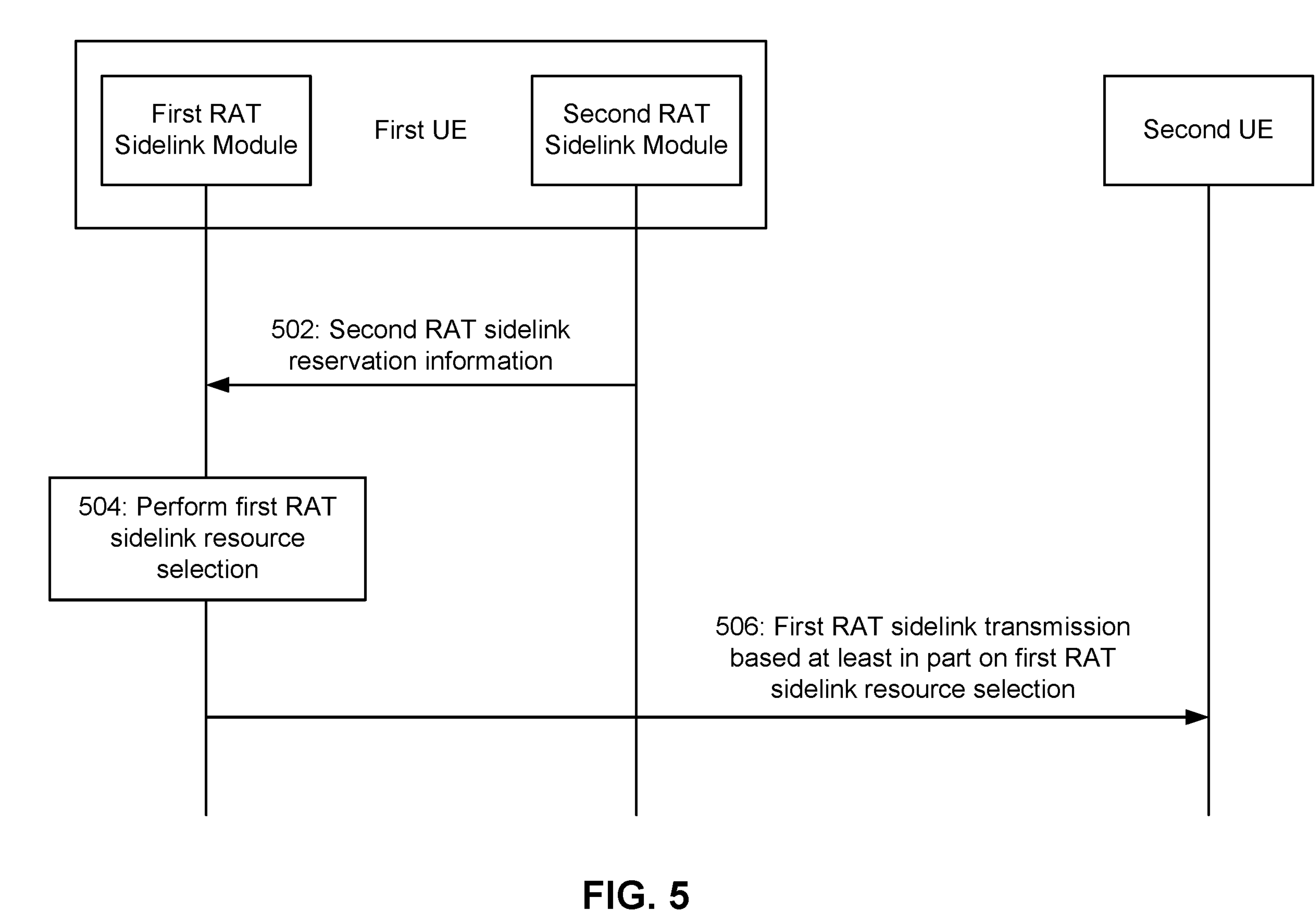
FIG. 5 is a diagram illustrating an example associated with sidelink resource selection based at least in part on an exclusion of physical sidelink feedback channel (PSFCH) slots, in accordance with the present disclosure.

FIG. 5 is a diagram illustrating an example 500 associated with sidelink resource selection based at least in part on an exclusion of PSFCH slots, in accordance with the present disclosure. As shown in FIG. 5, example 500 includes communication between a first UE (e.g., UE 120*a*) and a second UE (e.g., UE 120*e*). In some aspects, the first UE and the second UE may be included in a wireless network, such as wireless network 100.

In some aspects, the first UE may be a dual mode UE that supports a first RAT sidelink module (e.g., an NR sidelink module) and a second RAT sidelink module (e.g., an LTE sidelink module). The first RAT sidelink module may be collocated with the second RAT sidelink module. A first RAT may be an NR RAT. A second RAT may be an LTE RAT. The first UE may be an out-of-coverage UE.

As shown by reference number 502, the first UE may receive, by the first RAT sidelink module from the second RAT sidelink module, second RAT sidelink reservation information (e.g., LTE sidelink reservation information) associated with a second RAT reservation (e.g., an LTE reservation). The second RAT sidelink reservation information may indicate an RSRP value associated with received reservation information from another UE operating on the second RAT.

As shown by reference number 504, the first UE may perform, by the first RAT sidelink module, a first RAT sidelink resource selection (e.g., an NR sidelink resource selection) based at least in part on the RSRP value indicated in the second RAT sidelink reservation information in relation to a first RSRP threshold associated with the second RAT reservation or a second RSRP threshold associated with the second RAT reservation. The first RAT sidelink resource selection may be based at least in part on an exclusion or an inclusion of one or more single slot resources in a non-first-RAT-PSFCH slot (e.g., a non-NR-PSFCH slot) using the first RSRP threshold or in a first RAT PSFCH slot (e.g., an NR PSFCH slot) using the second RSRP threshold.

In some aspects, when performing the first RAT sidelink resource selection, the first UE may determine, based at least in part on the RSRP value indicated in the second RAT sidelink reservation information, that the second RAT reservation collides with the one or more single slot resources in the non-first RAT PSFCH slot. The first UE may include the one or more single slot resources in the non-first RAT PSFCH slot for a first RAT sidelink transmission (e.g., a PSSCH transmission) based at least in part on the RSRP value being less than the first RSRP threshold associated with the second RAT reservation. The first UE may exclude a plurality of single slot resources in the non-first RAT PSFCH slot based at least in part on a presence of a second RAT sidelink transmission from the second RAT sidelink module in the non-first RAT PSFCH slot.

In some aspects, the first UE may be a dual mode NR sidelink and LTE sidelink UE (e.g., a Type A UE). The first UE may be out-of-coverage, and thus may operate without a network node (e.g., Mode 2 NR and Mode 4 LTE). The first UE may include an LTE sidelink module and an NR sidelink module, such that the LTE sidelink module may be collocated with the NR sidelink module.

In some aspects, based at least in part on a differential exclusion of NR PSFCH slots, an NR sidelink may exclude single slot resources in a PSFCH slot using different RSRP thresholds. The exclusion of the single slot resources in the PSFCH slot with the different RSRP threshold may be based at least in part on LTE resource reservation information. The NR sidelink module may receive, from the LTE sidelink module, the LTE resource reservation information. The LTE resource reservation information may be associated with the LTE reservation. The LTE resource reservation information may indicate the RSRP value, which may be associated with the received reservation information from other LTE UEs.

In some aspects, depending on the RSRP value indicated in the LTE resource reservation information, which may be in a first iteration of a resource selection procedure, the first UE may determine that the LTE reservation collides with the one or more single slot resources in a slot that does not contain an NR PSFCH (e.g., a non-NR-PSFCH slot). The first UE, via an NR sidelink PHY layer associated with the first UE, may include this single slot in single slot resources for the first RAT sidelink transmission when a received RSRP value associated with the LTE reservation is less that the first RSRP threshold $$\gamma_1^0.$$

The first UE, via the NR sidelink PHY layer, may exclude a plurality of single slot resources (e.g., all resources) in the slot when an LTE sidelink transmission from the collocated LTE sidelink module is present in the slot.

In some aspects, when performing the first RAT sidelink resource selection, the first UE may determine, based at least in part on the RSRP value indicated in the second RAT sidelink reservation information, that the second RAT reservation collides with the one or more single slot resources in the first RAT PSFCH slot. The first UE may include the one or more single slot resources in the first RAT PSFCH slot for the first RAT sidelink transmission based at least in part on the RSRP value being less than the second RSRP threshold associated with the second RAT reservation. The first UE may refrain from excluding the one or more single slot resources in the first RAT PSFCH slot based at least in part on the second RAT reservation being for a transmission from the second RAT sidelink module. The second RSRP threshold associated with the second RAT reservation may be greater than the first RSRP threshold associated with the second RAT reservation.

In some aspects, depending on the RSRP value indicated in the LTE resource reservation information, which may be in the first iteration of the resource selection procedure, the first UE may determine that the LTE reservation collides with one or more single slot resources in a slot that contains an NR PSFCH. The first UE, via the NR sidelink PHY layer, may include these single slot resources for the first RAT sidelink transmission when a received RSRP associated with the LTE reservation is less that the second RSRP threshold $$\gamma_2^0.$$

Here, $$\gamma_2^0 > \gamma_1^0,$$

and in some cases, $$\gamma_2^0 = \infty,$$

such that resources may always be included in these slots. The first UE, via the NR sidelink PHY layer, may not exclude single slot resources when the LTE reservation is for an LTE sidelink transmission from the collocated LTE sidelink module.

In some aspects, when performing the first RAT sidelink resource selection, the first UE may exclude the one or more single slot resources in the first RAT PSFCH slot or in the non-first RAT PSFCH slot based at least in part on a first RAT sidelink sensing. In some aspects, the RSRP value indicated in the second RAT sidelink reservation information may be associated with a first iteration of a resource selection procedure. The first UE may determine that a quantity associated with the one or more single slot resources in a selection window after the first iteration is less than a threshold. The first UE may increment the first RSRP threshold associated with the second RAT reservation by a first increment value. The first UE may increment the second RSRP threshold associated with the second RAT reservation by a second increment value. Further, values associated with the first RSRP threshold, the second RSRP threshold, the first increment value, and the second increment value may be different for each of one or more traffic priority values associated with the second RAT reservation.

In some aspects, the first UE, via the NR sidelink PHY layer, may further perform a resource exclusion from an updated set based at least in part on the NR sidelink sensing. In some aspects, when a quantity of single slot resources in a selection window after one iteration is lower than the threshold, the first UE, via the NR sidelink PHY layer, may increment the first RSRP threshold associated with the LTE reservation by a first value $$\gamma_1^{i+1} \rightarrow \gamma_1^i + \Delta_1,$$

and increment the second RSRP threshold associated with the LTE reservation by a second value $$\gamma_2^{i+1} \rightarrow \gamma_2^i + \Delta_2,$$

where $\infty \geq \Delta_2 \geq \Delta_1$. In some aspects, the values of $$\gamma_1^0, \gamma_2^0,$$

$\Delta_1$ and $\Delta_2$ may be different for each of one or more traffic priority values associated with the LTE reservation/traffic.

In some aspects, the first UE may determine a conflict between a first RAT sidelink transmission associated with the first RAT sidelink module and a second RAT sidelink transmission associated with the second RAT sidelink module. The first RAT sidelink transmission and the second RAT sidelink transmission may be associated with an equal traffic priority. The first UE may drop the first RAT sidelink transmission based at least in part on the conflict occurring in the non-first RAT PSFCH slot. The first UE may drop the second RAT sidelink transmission based at least in part on the conflict occurring in the first RAT PSFCH slot.

In some aspects, regarding an inter-RAT conflict mitigation, a Tx-Tx conflict may occur between the NR sidelink module and the LTE sidelink module with equal traffic priorities. When the Tx-Tx conflict occurs in a slot that does not contain an NR PSFCH, an NR sidelink transmission may be dropped. When the Tx-Tx conflict occurs in a slot that contains an NR PSFCH resource, an LTE sidelink transmission may be dropped. In the case of unequal priorities, a lower priority transmission may be dropped.

As shown by reference number 506, the first UE may transmit, by the first RAT sidelink module and to a second UE, the first RAT sidelink transmission (e.g., an NR sidelink transmission, such as a PSSCH transmission) based at least in part on the first RAT sidelink resource selection. Due to the first RAT sidelink resource selection, the first RAT sidelink transmission may be less likely to collide with a second RAT sidelink transmission (e.g., an LTE sidelink transmission), thereby improving a performance of the first UE. For example, the first UE may experience fewer dropped sidelink transmissions due to the first RAT sidelink resource selection.

In some aspects, the first UE may transmit the NR sidelink transmission, which may be less likely to collide with the LTE sidelink transmission, due to the NR sidelink resource selection that eliminates or minimizes LTE sidelink and NR PSFCH collisions. During the NR sidelink resource selection, resources in a PSFCH are not being selected, but rather in a slot in which resources are provisioned for the PSFCH, PSSCH resources may be selected or excluded. The first UE may perform NR sidelink transmissions on selected PSSCH resources, and may avoid performing NR sidelink transmissions on excluded PSSCH resources (which are more likely to be associated with LTE sidelink collisions).

As indicated above, FIG. 5 is provided as an example. Other examples may differ from what is described with regard to FIG. 5.

Figure 6:
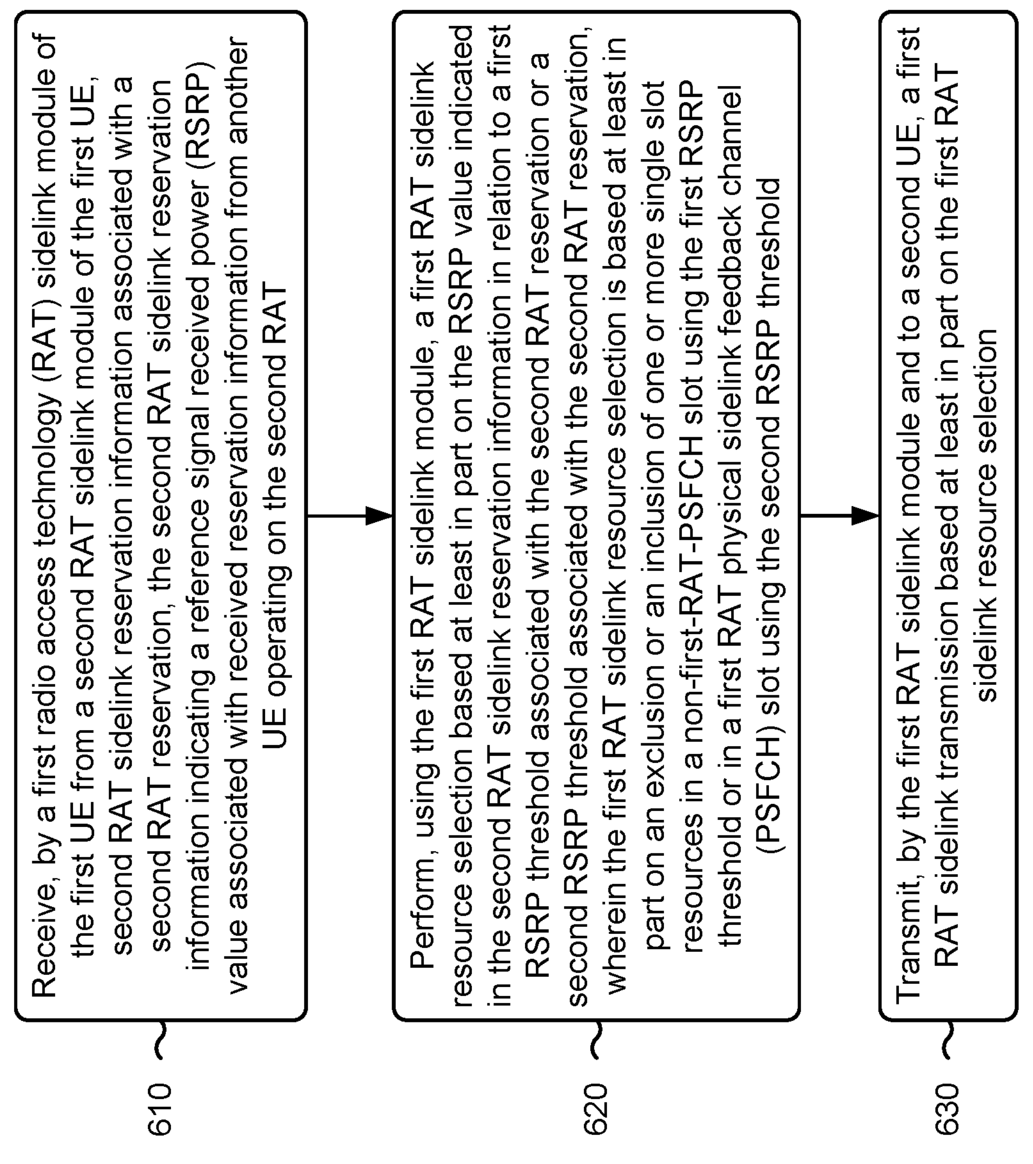
FIG. 6 is a diagram illustrating an example process associated with sidelink resource selection based at least in part on an exclusion of PSFCH slots, in accordance with the present disclosure.

FIG. 6 is a diagram illustrating an example process 600 performed, for example, by a UE, in accordance with the present disclosure. Example process 600 is an example where the UE (e.g., UE 120) performs operations associated with sidelink resource selection based at least in part on an exclusion of PSFCH slots.

As shown in FIG. 6, in some aspects, process 600 may include receiving, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT (block 610). For example, the UE (e.g., using reception component 702 and/or communication manager 706, depicted in FIG. 7) may receive, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT, as described above.

As further shown in FIG. 6, in some aspects, process 600 may include performing, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold (block 620). For example, the UE (e.g., using communication manager 706, depicted in FIG. 7) may perform, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold, as described above.

As further shown in FIG. 6, in some aspects, process 600 may include transmitting, by the first RAT sidelink module and to a second UE, a first RAT sidelink transmission based at least in part on the first RAT sidelink resource selection (block 630). For example, the UE (e.g., using transmission component 704 and/or communication manager 706, depicted in FIG. 7) may transmit, by the first RAT sidelink module and to a second UE, a first RAT sidelink transmission based at least in part on the first RAT sidelink resource selection, as described above.

Process 600 may include additional aspects, such as any single aspect or any combination of aspects described below and/or in connection with one or more other processes described elsewhere herein.

In a first aspect, the first RAT is an NR RAT, and the second RAT is an LTE RAT.

In a second aspect, alone or in combination with the first aspect, process 600 includes determining, based at least in part on the RSRP value indicated in the second RAT sidelink reservation information, that the second RAT reservation collides with the one or more single slot resources in the non-first-RAT-PSFCH slot.

In a third aspect, alone or in combination with one or more of the first and second aspects, process 600 includes including the one or more single slot resources in the non-first-RAT-PSFCH slot for the first RAT sidelink transmission based at least in part on the RSRP value being less than the first RSRP threshold associated with the second RAT reservation.

In a fourth aspect, alone or in combination with one or more of the first through third aspects, process 600 includes excluding a plurality of single slot resources in the non-first-RAT-PSFCH slot based at least in part on a presence of a second RAT sidelink transmission from the second RAT sidelink module in the non-first-RAT-PSFCH slot.

In a fifth aspect, alone or in combination with one or more of the first through fourth aspects, process 600 includes determining, based at least in part on the RSRP value indicated in the second RAT sidelink reservation information, that the second RAT reservation collides with the one or more single slot resources in the first RAT PSFCH slot.

In a sixth aspect, alone or in combination with one or more of the first through fifth aspects, process 600 includes including the one or more single slot resources in the first RAT PSFCH slot for the first RAT sidelink transmission based at least in part on the RSRP value being less than the second RSRP threshold associated with the second RAT reservation.

In a seventh aspect, alone or in combination with one or more of the first through sixth aspects, process 600 includes refraining from excluding the one or more single slot resources in the first RAT PSFCH slot based at least in part on the second RAT reservation being for a transmission from the second RAT sidelink module.

In an eighth aspect, alone or in combination with one or more of the first through seventh aspects, the second RSRP threshold associated with the second RAT reservation is greater than the first RSRP threshold associated with the second RAT reservation.

In a ninth aspect, alone or in combination with one or more of the first through eighth aspects, process 600 includes excluding the one or more single slot resources in the first RAT PSFCH slot or in the non-first-RAT-PSFCH slot based at least in part on a first RAT sidelink sensing.

In a tenth aspect, alone or in combination with one or more of the first through ninth aspects, the RSRP value indicated in the second RAT sidelink reservation information is associated with a first iteration of a resource selection procedure.

In an eleventh aspect, alone or in combination with one or more of the first through tenth aspects, process 600 includes determining that a quantity associated with the one or more single slot resources in a selection window after the first iteration is less than a threshold, incrementing the first RSRP threshold associated with the second RAT reservation by a first increment value, and incrementing the second RSRP threshold associated with the second RAT reservation by a second increment value.

In a twelfth aspect, alone or in combination with one or more of the first through eleventh aspects, values associated with the first RSRP threshold, the second RSRP threshold, the first increment value, and the second increment value are different for each of one or more traffic priority values associated with the second RAT reservation.

In a thirteenth aspect, alone or in combination with one or more of the first through twelfth aspects, process 600 includes determining a conflict between a first RAT sidelink transmission associated with the first RAT sidelink module and a second RAT sidelink transmission associated with the second RAT sidelink module, wherein the first RAT sidelink transmission and the second RAT sidelink transmission are associated with an equal traffic priority.

In a fourteenth aspect, alone or in combination with one or more of the first through thirteenth aspects, process 600 includes dropping the first RAT sidelink transmission based at least in part on the conflict occurring in the non-first-RAT-PSFCH slot.

In a fifteenth aspect, alone or in combination with one or more of the first through fourteenth aspects, process 600 includes dropping the second RAT sidelink transmission based at least in part on the conflict occurring in the first RAT PSFCH slot.

In a sixteenth aspect, alone or in combination with one or more of the first through fifteenth aspects, the first UE is a dual mode UE that supports the first RAT sidelink module and the second RAT sidelink module, and the first RAT sidelink module is collocated with the second RAT sidelink module.

In a seventeenth aspect, alone or in combination with one or more of the first through sixteenth aspects, the first UE is an out-of-coverage UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
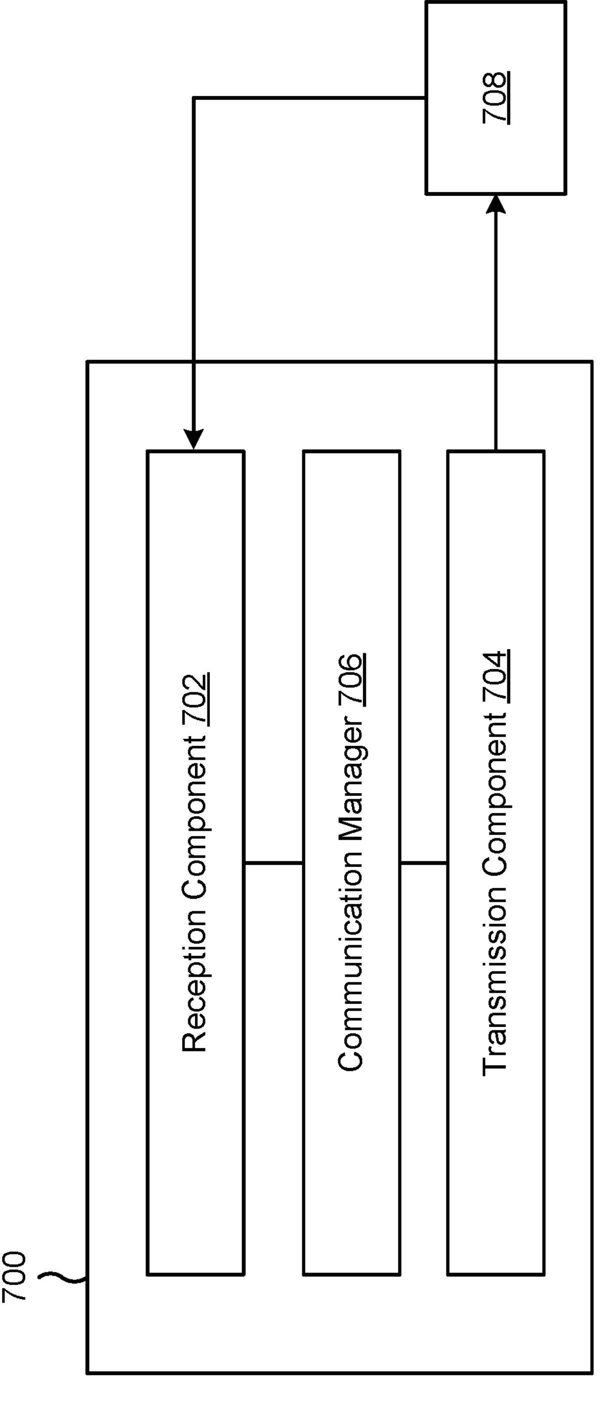
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a first UE, or a first UE may include the apparatus 700. In some aspects, the apparatus 700 includes a reception component 702, a transmission component 704, and/or a communication manager 706, which may be in communication with one another (for example, via one or more buses and/or one or more other components). In some aspects, the communication manager 706 is the communication manager 140 described in connection with FIG. 1. As shown, the apparatus 700 may communicate with another apparatus 708, such as a UE or a network node (such as a CU, a DU, an RU, or a base station), using the reception component 702 and the transmission component 704.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the first UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 708. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the first UE described in connection with FIG. 2.

The transmission component 704 may transmit communications, such as reference signals, control information, data communications, or a combination thereof, to the apparatus 708. In some aspects, one or more other components of the apparatus 700 may generate communications and may provide the generated communications to the transmission component 704 for transmission to the apparatus 708. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 704 may include one or more antennas, a modem, a modulator, a transmit MIMO processor, a transmit processor, a controller/processor, a memory, or a combination thereof, of the first UE described in connection with FIG. 2. In some aspects, the transmission component 704 may be co-located with the reception component 702 in a transceiver.

The communication manager 706 may support operations of the reception component 702 and/or the transmission component 704. For example, the communication manager 706 may receive information associated with configuring reception of communications by the reception component 702 and/or transmission of communications by the transmission component 704. Additionally, or alternatively, the communication manager 706 may generate and/or provide control information to the reception component 702 and/or the transmission component 704 to control reception and/or transmission of communications.

The communication manager 706 may receive, by a first RAT sidelink module of the first UE from a second RAT sidelink module of the first UE, second RAT sidelink reservation information associated with a second RAT reservation, the second RAT sidelink reservation information indicating an RSRP value associated with received reservation information from another UE operating on the second RAT. The communication manager 706 may perform, using the first RAT sidelink module, a first RAT sidelink resource selection based at least in part on the RSRP value indicated in the second RAT sidelink reservation information in relation to a first RSRP threshold associated with the second RAT reservation or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT PSFCH slot using the second RSRP threshold. The transmission component 704 may transmit, by the first RAT sidelink module and to a second UE, a first RAT sidelink transmission based at least in part on the first RAT sidelink resource selection.

The communication manager 706 may determine, based at least in part on the RSRP value indicated in the second RAT sidelink reservation information, that the second RAT reservation collides with the one or more single slot resources in the non-first-RAT-PSFCH slot. The communication manager 706 may include the one or more single slot resources in the non-first-RAT-PSFCH slot for the first RAT sidelink transmission based at least in part on the RSRP value being less than the first RSRP threshold associated with the second RAT reservation. The communication manager 706 may exclude a plurality of single slot resources in the non-first-RAT-PSFCH slot based at least in part on a presence of a second RAT sidelink transmission from the second RAT sidelink module in the non-first-RAT-PSFCH slot.

The communication manager 706 may determine, based at least in part on the RSRP value indicated in the second RAT sidelink reservation information, that the second RAT reservation collides with the one or more single slot resources in the first RAT PSFCH slot. The communication manager 706 may include the one or more single slot resources in the first RAT PSFCH slot for the first RAT sidelink transmission based at least in part on the RSRP value being less than the second RSRP threshold associated with the second RAT reservation. The communication manager 706 may refrain from excluding the one or more single slot resources in the first RAT PSFCH slot based at least in part on the second RAT reservation being for a transmission from the second RAT sidelink module. The communication manager 706 may exclude the one or more single slot resources in the first RAT PSFCH slot or in the non-first-RAT-PSFCH slot based at least in part on a first RAT sidelink sensing.

The communication manager 706 may determine that a quantity associated with the one or more single slot resources in a selection window after the first iteration is less than a threshold. The communication manager 706 may increment the first RSRP threshold associated with the second RAT reservation by a first increment value. The communication manager 706 may increment the second RSRP threshold associated with the second RAT reservation by a second increment value.

The communication manager 706 may determine a conflict between a first RAT sidelink transmission associated with the first RAT sidelink module and a second RAT sidelink transmission associated with the second RAT sidelink module, wherein the first RAT sidelink transmission and the second RAT sidelink transmission are associated with an equal traffic priority. The communication manager 706 may drop the first RAT sidelink transmission based at least in part on the conflict occurring in the non-first-RAT-PSFCH slot. The communication manager 706 may drop the second RAT sidelink transmission based at least in part on the conflict occurring in the first RAT PSFCH slot.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a first user equipment (UE), comprising: receiving, by a first radio access technology (RAT) sidelink module of the first UE from a second RAT sidelink module of the first UE, second RAT sidelink reservation information associated with a second RAT reservation, the second RAT sidelink reservation information indicating a reference signal received power (RSRP) value associated with received reservation information from another UE operating on the second RAT; performing, using the first RAT sidelink module, a first RAT sidelink resource selection based at least in part on the RSRP value indicated in the second RAT sidelink reservation information in relation to a first RSRP threshold or a second RSRP threshold associated with the second RAT reservation, wherein the first RAT sidelink resource selection is based at least in part on an exclusion or an inclusion of one or more single slot resources in a non-first-RAT-PSFCH slot using the first RSRP threshold or in a first RAT physical sidelink feedback channel (PSFCH) slot using the second RSRP threshold; and transmitting, by the first RAT sidelink module and to a second UE, a first RAT sidelink transmission based at least in part on the first RAT sidelink resource selection.

Aspect 2: The method of Aspect 1, wherein the first RAT is a New Radio (NR) RAT, and the second RAT is a Long Term Evolution (LTE) RAT.

Aspect 3: The method of any of Aspects 1-2, wherein performing the first RAT sidelink resource selection comprises: determining, based at least in part on the RSRP value indicated in the second RAT sidelink reservation information, that the second RAT reservation collides with the one or more single slot resources in the non-first-RAT-PSFCH slot.

Aspect 4: The method of Aspect 3, wherein performing the first RAT sidelink resource selection comprises: including the one or more single slot resources in the non-first-RAT-PSFCH slot for the first RAT sidelink transmission based at least in part on the RSRP value being less than the first RSRP threshold associated with the second RAT reservation.

Aspect 5: The method of Aspect 3, wherein performing the first RAT sidelink resource selection comprises: excluding a plurality of single slot resources in the non-first-RAT-PSFCH slot based at least in part on a presence of a second RAT sidelink transmission from the second RAT sidelink module in the non-first-RAT-PSFCH slot.

Aspect 6: The method of any of Aspects 1-5, wherein performing the first RAT sidelink resource selection comprises: determining, based at least in part on the RSRP value indicated in the second RAT sidelink reservation information, that the second RAT reservation collides with the one or more single slot resources in the first RAT PSFCH slot.

Aspect 7: The method of Aspect 6, wherein performing the first RAT sidelink resource selection comprises: including the one or more single slot resources in the first RAT PSFCH slot for the first RAT sidelink transmission based at least in part on the RSRP value being less than the second RSRP threshold associated with the second RAT reservation.

Aspect 8: The method of Aspect 6, wherein performing the first RAT sidelink resource selection comprises: refraining from excluding the one or more single slot resources in the first RAT PSFCH slot based at least in part on the second RAT reservation being for a transmission from the second RAT sidelink module.

Aspect 9: The method of any of Aspects 1-8, wherein the second RSRP threshold associated with the second RAT reservation is greater than the first RSRP threshold associated with the second RAT reservation.

Aspect 10: The method of any of Aspects 1-9, wherein performing the first RAT sidelink resource selection comprises: excluding the one or more single slot resources in the first RAT PSFCH slot or in the non-first-RAT-PSFCH slot based at least in part on a first RAT sidelink sensing.

Aspect 11: The method of any of Aspects 1-10, wherein the RSRP value indicated in the second RAT sidelink reservation information is associated with a first iteration of a resource selection procedure.

Aspect 12: The method of Aspect 11, further comprising: determining that a quantity associated with the one or more single slot resources in a selection window after the first iteration is less than a threshold; incrementing the first RSRP threshold associated with the second RAT reservation by a first increment value; and incrementing the second RSRP threshold associated with the second RAT reservation by a second increment value.

Aspect 13: The method of Aspect 12, wherein values associated with the first RSRP threshold, the second RSRP threshold, the first increment value, and the second increment value are different for each of one or more traffic priority values associated with the second RAT reservation.

Aspect 14: The method of any of Aspects 1-13, further comprising: determining a conflict between a first RAT sidelink transmission associated with the first RAT sidelink module and a second RAT sidelink transmission associated with the second RAT sidelink module, wherein the first RAT sidelink transmission and the second RAT sidelink transmission are associated with an equal traffic priority.

Aspect 15: The method of Aspect 14, further comprising: dropping the first RAT sidelink transmission based at least in part on the conflict occurring in the non-first-RAT-PSFCH slot.

Aspect 16: The method of Aspect 14, further comprising: dropping the second RAT sidelink transmission based at least in part on the conflict occurring in the first RAT PSFCH slot.

Aspect 17: The method of any of Aspects 1-16, wherein the first UE is a dual mode UE that supports the first RAT sidelink module and the second RAT sidelink module, and wherein the first RAT sidelink module is collocated with the second RAT sidelink module.

Aspect 18: The method of any of Aspects 1-17, wherein the first UE is an out-of-coverage UE.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:

one or more memories; and one or more processors, based at least in part on information stored in the one or more memories, are configured to:

receive, by a first radio access technology (RAT) sidelink module of the first UE from a second RAT sidelink module of the first UE, second RAT sidelink reservation information indicating a reference signal received power (RSRP) value associated with reservation information of a second UE operating on a second RAT;

perform, using the first RAT sidelink module, a first RAT sidelink resource selection, to exclude or include one or more single slot resources in a non-first-RAT physical sidelink feedback channel (PSFCH) slot or in a first RAT PSFCH slot, based at least in part on the RSRP value in relation to:

a first RSRP threshold when the one or more single slot resources are in the non-first-RAT-PSFCH slot, or a second RSRP threshold when the one or more single slot resources are in the first RAT PSFCH slot, wherein, to perform the first RAT sidelink resource selection, the one or more processors are configured to:

determine, based at least in part on the RSRP value indicated in the second RAT sidelink reservation information, that the second RAT reservation collides with the one or more single slot resources in the first RAT PSFCH slot, and refrain from excluding the one or more single slot resources in the first RAT PSFCH slot based at least in part on the second RAT reservation being for a transmission from the second RAT sidelink module; and transmit, by the first RAT sidelink module and to a third UE, a first RAT sidelink transmission based at least in part on the first RAT sidelink resource selection.

2. The apparatus of claim 1, wherein the first RAT is a New Radio (NR) RAT, and the second RAT is a Long Term Evolution (LTE) RAT.

3. The apparatus of claim 1, wherein the one or more processors, to perform the first RAT sidelink resource selection, are configured to:

determine, based at least in part on the RSRP value indicated in the second RAT sidelink reservation information, that the second RAT reservation collides with the one or more single slot resources in the non-first-RAT-PSFCH slot.

4. The apparatus of claim 3, wherein the one or more processors, to perform the first RAT sidelink resource selection, are configured to:

include the one or more single slot resources in the non-first-RAT-PSFCH slot for the first RAT sidelink transmission based at least in part on the RSRP value being less than the first RSRP threshold associated with the second RAT reservation.

5. The apparatus of claim 3, wherein the one or more processors, to perform the first RAT sidelink resource selection, are configured to:

exclude a plurality of single slot resources in the non-first-RAT-PSFCH slot based at least in part on a presence of a second RAT sidelink transmission from the second RAT sidelink module in the non-first-RAT-PSFCH slot.

6. The apparatus of claim 1, wherein the second RSRP threshold associated with the second RAT reservation is greater than the first RSRP threshold associated with the second RAT reservation.

7. The apparatus of claim 1, wherein the one or more processors, to perform the first RAT sidelink resource selection, are configured to:

exclude the one or more single slot resources in the first RAT PSFCH slot or in the non-first-RAT-PSFCH slot based at least in part on a first RAT sidelink sensing.

8. The apparatus of claim 1, wherein the RSRP value indicated in the second RAT sidelink reservation information is associated with a first iteration of a resource selection procedure.

9. The apparatus of claim 8, wherein the one or more processors are configured to:

determine that a quantity associated with the one or more single slot resources in a selection window after the first iteration is less than a threshold;

increment the first RSRP threshold associated with the second RAT reservation by a first increment value; and increment the second RSRP threshold associated with the second RAT reservation by a second increment value.

10. The apparatus of claim 9, wherein values associated with the first RSRP threshold, the second RSRP threshold, the first increment value, and the second increment value are different for each of one or more traffic priority values associated with the second RAT reservation.

11. The apparatus of claim 1, wherein the one or more processors are configured to:

determine a conflict between a first RAT sidelink transmission associated with the first RAT sidelink module and a second RAT sidelink transmission associated with the second RAT sidelink module, wherein the first RAT sidelink transmission and the second RAT sidelink transmission are associated with an equal traffic priority.

12. The apparatus of claim 11, wherein the one or more processors are configured to:

drop the first RAT sidelink transmission based at least in part on the conflict occurring in the non-first-RAT-PSFCH slot.

13. The apparatus of claim 11, wherein the one or more processors are configured to:

drop the second RAT sidelink transmission based at least in part on the conflict occurring in the first RAT PSFCH slot.

14. The apparatus of claim 1, wherein the first UE is a dual mode UE that supports the first RAT sidelink module and the second RAT sidelink module, and wherein the first RAT sidelink module is collocated with the second RAT sidelink module.

15. The apparatus of claim 1, wherein the first UE is an out-of-coverage UE.

16. A method of wireless communication performed by a first user equipment (UE), comprising:

receiving, by a first radio access technology (RAT) sidelink module of the first UE from a second RAT sidelink module of the first UE, second RAT sidelink reservation information indicating a reference signal received power (RSRP) value associated with reservation information of a second UE operating on a second RAT;

performing, using the first RAT sidelink module, a first RAT sidelink resource selection, to exclude or include one or more single slot resources in a non-first-RAT physical sidelink feedback channel (PSFCH) slot or in a first RAT PSFCH slot, based at least in part on the RSRP value indicated in relation to:

a first RSRP threshold when the one or more single slot resources are in the non-first-RAT-PSFCH slot, or a second RSRP threshold when the one or more single slot resources are in the first RAT PSFCH slot, wherein performing the first RAT sidelink resource selection comprises:

determining, based at least in part on the RSRP value indicated in the second RAT sidelink reservation information, that the second RAT reservation collides with the one or more single slot resources in the first RAT PSFCH slot, and refraining from excluding the one or more single slot resources in the first RAT PSFCH slot based at least in part on the second RAT reservation being for a transmission from the second RAT sidelink module; and transmitting, by the first RAT sidelink module and to a third UE, a first RAT sidelink transmission based at least in part on the first RAT sidelink resource selection.

17. The method of claim 16, wherein the first RAT is a New Radio (NR) RAT, and the second RAT is a Long Term Evolution (LTE) RAT.

18. The method of claim 16, wherein performing the first RAT sidelink resource selection comprises:

determining, based at least in part on the RSRP value indicated in the second RAT sidelink reservation information, that the second RAT reservation collides with the one or more single slot resources in the non-first-RAT-PSFCH slot;

including the one or more single slot resources in the non-first-RAT-PSFCH slot for the first RAT sidelink transmission based at least in part on the RSRP value being less than the first RSRP threshold associated with the second RAT reservation;

excluding a plurality of single slot resources in the non-first-RAT-PSFCH slot based at least in part on a presence of a second RAT sidelink transmission from the second RAT sidelink module in the non-first-RAT-PSFCH slot; or determining, based at least in part on the RSRP value indicated in the second RAT sidelink reservation information, that the second RAT reservation collides with the one or more single slot resources in the first RAT PSFCH slot.

19. The method of claim 16, wherein the second RSRP threshold associated with the second RAT reservation is greater than the first RSRP threshold associated with the second RAT reservation.

20. The method of claim 16, wherein performing the first RAT sidelink resource selection comprises:

excluding the one or more single slot resources in the first RAT PSFCH slot or in the non-first-RAT-PSFCH slot based at least in part on a first RAT sidelink sensing.

21. The method of claim 16, wherein the RSRP value indicated in the second RAT sidelink reservation information is associated with a first iteration of a resource selection procedure, and further comprising:

determining that a quantity associated with the one or more single slot resources in a selection window after the first iteration is less than a threshold;

incrementing the first RSRP threshold associated with the second RAT reservation by a first increment value; and incrementing the second RSRP threshold associated with the second RAT reservation by a second increment value, wherein values associated with the first RSRP threshold, the second RSRP threshold, the first increment value, and the second increment value are different for each of one or more traffic priority values associated with the second RAT reservation.

22. The method of claim 16, further comprising:

determining a conflict between a first RAT sidelink transmission associated with the first RAT sidelink module and a second RAT sidelink transmission associated with the second RAT sidelink module, wherein the first RAT sidelink transmission and the second RAT sidelink transmission are associated with an equal traffic priority;

dropping the first RAT sidelink transmission based at least in part on the conflict occurring in the non-first-RAT-PSFCH slot; or dropping the second RAT sidelink transmission based at least in part on the conflict occurring in the first RAT PSFCH slot.

23. The method of claim 16, wherein the first UE is a dual mode UE that supports the first RAT sidelink module and the second RAT sidelink module, and wherein the first RAT sidelink module is collocated with the second RAT sidelink module.

24. The method of claim 16, wherein the first UE is an out-of-coverage UE.

25. A non-transitory computer-readable medium storing a set of instructions for wireless communication, the set of instructions comprising:

one or more instructions that, when executed by one or more processors of a first user equipment (UE), cause the first UE to:

receive, by a first radio access technology (RAT) sidelink module of the first UE from a second RAT sidelink module of the first UE, second RAT sidelink reservation information indicating a reference signal received power (RSRP) value associated with reservation information of a second UE operating on a second RAT;

perform, using the first RAT sidelink module, a first RAT sidelink resource selection, to exclude or include one or more single slot resources in a non-first-RAT physical sidelink feedback channel (PSFCH) slot or in a first RAT PSFCH slot, based at least in part on the RSRP value in relation to:

a first RSRP threshold associated with the second RAT reservation when the one or more single slot resources are in the non-first-RAT-PSFCH slot, or a second RSRP threshold when the one or more single slot resources are in the first RAT PSFCH slot, wherein, to perform the first RAT sidelink resource selection, the one or more processors are configured to:

determine, based at least in part on the RSRP value indicated in the second RAT sidelink reservation information, that the second RAT reservation collides with the one or more single slot resources in the first RAT PSFCH slot, and refrain from excluding the one or more single slot resources in the first RAT PSFCH slot based at least in part on the second RAT reservation being for a transmission from the second RAT sidelink module; and transmit, by the first RAT sidelink module and to a second UE, a first RAT sidelink transmission based at least in part on the first RAT sidelink resource selection.

26. The non-transitory computer-readable medium of claim 25, wherein the first RAT is a New Radio (NR) RAT, and the second RAT is a Long Term Evolution (LTE) RAT.

27. The non-transitory computer-readable medium of claim 25, wherein the one or more instructions, that cause the first UE to perform the first RAT sidelink resource selection, are configured to:

determine, based at least in part on the RSRP value indicated in the second RAT sidelink reservation information, that the second RAT reservation collides with the one or more single slot resources in the non-first-RAT-PSFCH slot.

28. A first apparatus for wireless communication, comprising:

means for receiving, by a first radio access technology (RAT) sidelink module of the first apparatus from a second RAT sidelink module of the first apparatus, second RAT sidelink reservation information indicating a reference signal received power (RSRP) value associated with reservation information of a second apparatus operating on a second RAT;

means for performing, using the first RAT sidelink module, a first RAT sidelink resource selection, to exclude or include one or more single slot resources in a non-first-RAT physical sidelink feedback channel (PSFCH) slot or in a first RAT PSFCH slot, based at least in part on the RSRP value in relation to:

a first RSRP threshold when the one or more single slot resources are in the non-first-RAT-PSFCH slot, or a second RSRP threshold when the one or more single slot resources are in the first RAT PSFCH slot using the second RSRP threshold, wherein the means for performing the first RAT sidelink resource selection comprises:

means for determining, based at least in part on the RSRP value indicated in the second RAT sidelink reservation information, that the second RAT reservation collides with the one or more single slot resources in the first RAT PSFCH slot, and means for refraining from excluding the one or more single slot resources in the first RAT PSFCH slot based at least in part on the second RAT reservation being for a transmission from the second RAT sidelink module; and means for transmitting, by the first RAT sidelink module and to a second apparatus, a first RAT sidelink transmission based at least in part on the first RAT sidelink resource selection.

29. The first apparatus of claim 28, wherein the first RAT is a New Radio (NR) RAT, and the second RAT is a Long Term Evolution (LTE) RAT.

30. The first apparatus of claim 28, wherein the means for performing the first RAT sidelink resource selection comprises:

means for determining, based at least in part on the RSRP value indicated in the second RAT sidelink reservation information, that the second RAT reservation collides with the one or more single slot resources in the non-first-RAT-PSFCH slot.

* * * * *